US006792469B1

(12) United States Patent
Callahan et al.

(10) Patent No.: US 6,792,469 B1
(45) Date of Patent: Sep. 14, 2004

(54) SYSTEM AND METHOD FOR MONITORING AND CONTROLLING THE PRODUCTION OF AUDIO AND VIDEO STREAMS

(75) Inventors: Mary Kathleen Callahan, St. Louis, MO (US); Michael Adam Kinstrey, Ballston Spa, NY (US); David Lavan Henderson, Clifton Park, NY (US); Kevin Bernard Kenny, Niskayuna, NY (US); Christopher Reynolds Hammond, Schenectady, NY (US); Helena Goldfarb, Niskayuna, NY (US); Brion Daryl Sarachan, Schenectady, NY (US); Alexandra Jay Schmidt, Niskayuna, NY (US); Stephen John Angelovich, Yonkers, NY (US); John Espirito Santo Amaral, Westport, CT (US); Ralph Andrew Minerva, Thornwood, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/531,864

(22) Filed: Mar. 21, 2000

Related U.S. Application Data

(60) Provisional application No. 60/125,556, filed on Mar. 22, 1999.

(51) Int. Cl.[7] ........................... G06F 15/16; H04N 7/025
(52) U.S. Cl. ......................................... 709/231; 725/36
(58) Field of Search .......................... 707/10; 709/227, 709/102, 203, 231; 705/8, 28; 725/104, 40, 14, 32, 36, 109, 142, 146, 148, 134, 87, 127, 89; 714/746; 700/94; 379/106.01

(56) References Cited

U.S. PATENT DOCUMENTS

| 5,099,319 | A | * | 3/1992 | Esch et al. ..................... 725/36 |
| 5,311,423 | A | * | 5/1994 | Clark ............................. 705/8 |
| 5,367,330 | A | * | 11/1994 | Haave et al. ................ 725/104 |
| 5,559,548 | A | * | 9/1996 | Davis et al. .................. 725/40 |
| 5,790,423 | A | * | 8/1998 | Lau et al. ..................... 700/94 |
| 5,857,190 | A | * | 1/1999 | Brown ......................... 707/10 |
| 5,861,906 | A | * | 1/1999 | Dunn et al. ................... 725/87 |
| 6,154,744 | A | * | 11/2000 | Kenner et al. ................ 707/10 |
| 6,160,989 | A | * | 12/2000 | Hendricks et al. ........... 725/36 |
| 6,212,657 | B1 | * | 4/2001 | Wang et al. ................ 714/746 |
| 6,529,590 | B1 | * | 3/2003 | Centers ................. 379/106.01 |

* cited by examiner

Primary Examiner—Zarni Maung
Assistant Examiner—Kenny Lin

(57) ABSTRACT

An Integration Controller integrates broadcast automation systems and thereby provides a single command and control center for monitoring production of the audio and video stream. An event-based schedule, or a "playlist," specifies the segments to be played along with the necessary timing and hardware information. Each event in the schedule commands the playback or record of a video segment, generation of a special effect, transfer of a video segment from one device to another or closure of one or more video switches. Events may be launched automatically at a specified time, or manually by an operator. An Integration Controller (IC) communicates with an Event Scheduling System via a Scheduling System Interface. The Scheduling System Interface communicates with the Integration Controller via the IC server. The IC server utilizes various modules to communicate with Device Drivers, a Log Manager and one or more User Interfaces.

17 Claims, 3 Drawing Sheets

SYSTEM AND METHOD FOR MONITORING AND CONTROLLING THE PRODUCTION OF AUDIO AND VIDEO STREAMS

CROSS-REFERENCE TO RELATED APPLICATIONS

This application claims priority to provisional patent application Serial No. 60/125,556 filed Mar. 22, 1999, the entire subject matter of which is incorporated herein by reference.

BACKGROUND OF THE INVENTION

This invention relates to broadcast automation systems, and more particularly to a system and method for integrating the schedule management, playback and media management of digital audio and video in response to an event-based playback schedule.

The stream of audio and video that makes up a television signal is usually generated by playing a series of pre-recorded video segments from playback devices such as tape machines or video servers. The video clips alternate between taped show segments, commercials and other promotional materials. Live video signals are interspersed with the pre-recorded segments by controlling video switches. Automatically generating the video stream based on an electronic schedule requires controlling and monitoring not only a set of networked playback devices, but also the video switches and systems for managing acquisition, storage and retrieval of the pre-recorded segments. Previously developed broadcast automation systems have automated a number of these functions, but operating and managing an entire system required a great deal of manual coordination.

SUMMARY OF THE INVENTION

In an exemplary embodiment of the invention, an Integration Controller uniquely integrates broadcast automation systems and provides a single command and control center for monitoring and controlling production of the audio and video stream.

The primary input to the Integration Controller is an event-based schedule, also known as a "playlist," that specifies the segments to be played along with the necessary timing and hardware information. Each event in the schedule commands the playback or record of a video segment, generation of a special effect, transfer of a video segment from one device to another or closure of one or more video switches. Events may be launched automatically at a specified time, or manually by an operator. Parent-child relationships are also maintained to allow a group of related events to be launched with a single command.

In response to the schedule, the Integration Controller performs six primary functions:

Analyze the schedule for inconsistent or malformed data, and check for availability of video material on archive devices prior to execution;

Submit commands to the necessary real-time subsystems to execute each valid event;

Monitor each of the subsystems to collect and summarize the status of certain events;

Provide a set of user-interfaces to allow an operator to view the schedule and any corresponding errors, edit the schedule, and manually begin the execution of certain events;

Maintain transaction logs of all event transitions, message traffic, and system status; and Allow an operator to query and modify the status of various video segments and devices.

The preferred embodiment also incorporates redundancy so that programming will not be delayed or lost due to component failures. Components can be added, removed, or reconfigured without shutting down the system. The Integration Controllers (ICs) may be reconfigured dynamically through the use of a configuration files. Sectional or geographical segments may be programmed for identical time slots on various Integration Controllers which operate different devices. Thus, the main segment (i.e., television network programming) will be sent to all applicable ICs, but secondary segments sent to the ICs (i.e., commercials/advertisements) will vary depending on geography or other factors.

DETAILED DESCRIPTION OF THE INVENTION

Figure 1:
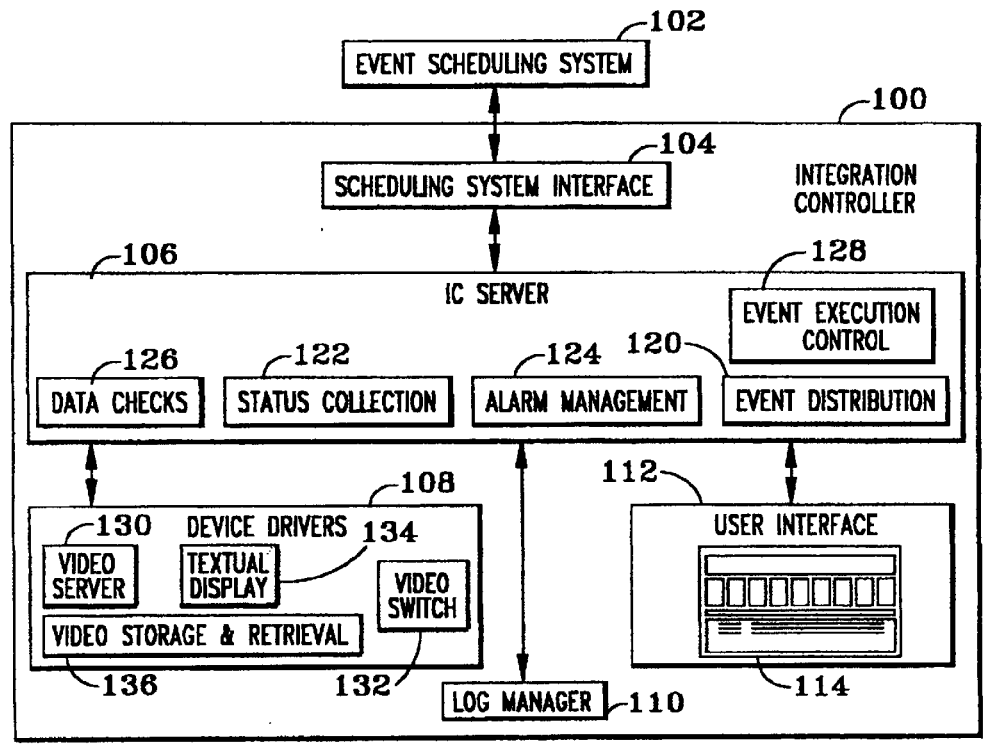
FIG. 1 shows a single Integration Controller decomposed into its structural and functional elements.

Referring to the drawings, and more particularly to FIG. 1, a system for controlling digital video and audio is shown. An Integration Controller (IC) 100 communicates with an Event Scheduling System 102 via a Scheduling System Interface 104. The event Scheduling System 102 contains a high-availability database and event server. The component of the IC that communicates with the Scheduling System Interface 104 is the IC server 106. The IC is transaction based, i.e., acting on events in the schedule, and provides continuous dynamic material management to the device drivers. The IC server utilizes various modules to communicate with Device Drivers 108, a Log Manager 110 and one or more User Interfaces 112. These five major subsystems within the Integration Controller (i.e., Scheduling System Interface, IC Server, Device Drivers, User Interface and Log Manager) are discussed in more detail below.

All major IC subsystems can be rearchitected at run time by adding/removing objects from the systems. In the preferred embodiment, the user interface is written in the Tcl/Tk (with TclPrO™) scripting language available from Scriptics Corporation of Mountain View, Calif. (http://www.scriptics.com). The ability to rearchitect at runtime is made possible by instantiating and reconfiguring the IC subsytems in any needed way using a Tcl/Tk console via a user interface.

An example of the scripting for rearchitecting an IC by adding a new filter and inserting it into a pipeline is shown below.

```
# Name the host that needs to be adapted.
set host 3.3.238.72
# Procedure to catch a MakeEventStatus message coming up from TAM
# and send it back down to TAM.
# Parameters:
#      alist -- NetSys message expressed as a Tcl associative list.
#      replyToken -- NetSys reply token
proc reflect { alist replyToken } {
    array set m $alist;          # Unpack the message
    if (![string compare $m(MessageClass)
MakeEventStatusMessageClass]} {
        # Reflect MakeEventStatus
        tn HandleMessageDownward m
    }
    return
}
# Make a new NetSys chain
#      Tcl node
#      |
#      Shutdown filter
#      |
#      Tcl command broker
#      |
#      Group
#      |
#      Socket client ---> IC Server
TclNodeClass tn
ShutdownFilterClass ShutdownFilter
TclCommandBrokerClass TclCommandBroker
GroupBaseClass gr
SocketClientClass theClient genesis_ic $host
tn InsertNode ShutdownFilter
ShutdownFilter InsertNode TclCommandBroker
TclCommandBroker InsertNode gr
gr InsertNode theClient
# Route MakeEventStatus messages into the 'reflect' procedure
# defined above
tn BindMessageUpward MakeEventStatusMessageClass reflect
# Send a message down to the IC Server to tell the operator that this
# harness is running.
array set runningMessage {
    MessageClass      AlarmMessageClass
    Type              DeviceState
    Owner             Kevin
    Code              { }
    Originator        GE05
    ShowAsAlarm       true
    Severity          yellow
    SubType           SetAlarm
}
set runningMessage(Detail) "Kevin's special harness running on [info
hostname]"
set runningMessage(VerboseMessage) $m(Detail)
tn HandleMessageDownward runningMessage
# Prepare to clear the message when this process exits
set runningMessage(SubType) ClearAlarm
# Procedure to exit when this process exits
proc done { } {
    # Tell the IC Server to clear the operator alert
    global runningMessage
    tn HandleMessageDownward runningMessage
    # Give IC Server a second to handle the message, and quit.
    after 1000 exit
}
# UI consists of just a 'quit' button
grid (button .quit -text {Back to normal mode} -command done]
# Also do the 'done' procedure when the user dismisses the window
# from the title bar, taskbar, or Task Manager.
wm protocol . WM_DELETE_WINDOW done
```

The Integration Controller is a highly configurable application. All Integration Controller types are run from one executable file. Information that makes an IC unique is specified in a configuration file. An example configuration file for a specific IC named "GEO5" is shown below. This particular IC is defined to display channels 41 through 48.

| | |
|---|---|
| ic_name | "GE05" |
| ic_type | "IC" |
| ic_display_channels | "CHAN-41 CHAN-42 CHAN-43 CHAN-44 CHAN-45 CHAN-46 CHAN-47 CHAN-48" |
| ic_filter_channels | "CHAN-41 CHAN-42 CHAN-43 CHAN-44 CHAN-45 CHAN-46 CHAN-47 CHAN-48" |
| tab_ic_sched | "IC Schedule" |
| tab_channels | "Channel Schedule" |
| tab_skypath | "Skypath" |
| tab_contin | "*Contingencies" |
| tab_recordings | "Recordings" |
| tab_crispin | "Crispin" |
| tab_resources | "*Resource Allocations" |
| tab_material | "Material Mgmt" |
| tab_status | "*Device Status" |
| tab_control | "Control" |
| tab_editing | "*Editing" |
| tab_logs | "Logs" |
| tab_dub_station | "*Dub Station" |
| tab_system_status | "*System status" |
| dub_device | "DBX-01" |
| dub_vtr | "VTR-99" |
| dub_component | "INT:/default" |
| hardware_path | "X" |
| archive_devices | "SX SY LX LY" |
| oai_subscriptions | "EV TA TE AA AC AK AP AD SD SM" |
| subscription_windows | "EV:06 TA:06 TE:06 AA:06 AC:06 AK:06 AP:06 AD:06 SD:06 SM:06" |
| heartbeat_rate | "30000" |
| executable_event_threshold | "0" |
| mix_event_clip | "563" |
| mix_event_gain | "530" |
| alarm_subscriptions | "GE03 GE02" |
| monitored_processes | " " |
| flush_profile | "yes" |
| ODBC_db_primary | "PROCCRD" |
| ODBC_srvr_primary | "server2" |
| ODBC_dsn_primary | "PROCCRD" |
| ODBC_uid_primary | "sysadm" |
| ODBC_pwd_primary | "sysadm" |
| MAPP_TCPIP_SERVER_primary | "KRAMER" |
| ODBC_db_protect | "PROCCRD" |
| ODBC_srvr_protect | "server2" |
| ODBC_dsn_protect | "PROCCRD" |
| ODBC_uid_protect | "sysadm" |
| ODBC_pwd_protect | "sysadm" |
| MAPP_TCPIP_SERVER_protect | "KRAMER" |
| use_primary_DB | "yes" |
| ras_host_air | "KRAMER" |
| ras_host_protect | "KRAMER" |

The IC reads this text file at start-up and based on the information that is specified in the file determines:

IC name;

IC type, for example, Broadcast Operation Controller (BOC), Material Transfer Manager (TCM), Material Acquisition Manager (TAM), Distribution Router Controller (DRC), Dub station, etc.;

Channels to display;

tabs to show in user interface;

messages that it will receive from Scheduling System;

rolling window;

names of other ICs to monitor; and other data, as desired.

In case of emergencies, an IC can be reconfigured dynamically by entering new settings in the Tcl console, since IC is written in Tcl/Tk (a scripting language). Thus, the IC supports dynamic runtime configuration of the runtime software. The set of resources that the IC uses/controls is not fixed in advance but maintained in a local database. The IC reads this information at start-up or when the Refresh option of View menu in the user interface is selected. Thus, the IC supports dynamic runtime configuration of hardware.

Moreover, the architecture is failure tolerant. All IC major components are run as independent processes. They can be shutdown-fixed-restarted independently without bringing down the whole system. If one of the components crashes, the functionality for which it is responsible will not be performed, but the rest of the subsystems will run and perform their functionality. All IC major subsystems have restoration ability. They can be fixed/reconfigured at run time in Tcl.

The Scheduling System Interface subsystem 104 manages communication between the Event Scheduling System 102 and the rest of the Integration Controller 100. Its primary functions are to translate the data between the two systems and to regulate data flow according to priority in both directions to a rate that is acceptable by the receiver. The IC provides time synchronization capabilities with respect to driving the devices. It can follow house time, card-generated time or internal time. An IC provides time Synchronization monitoring and reconciliation. An IC gets time from an external source; it monitors that the time-code has been received. It maintains its system clock according to that time-code or maintains free-running system clock when it fails to receive the time-code. IC queries other hardware devices for time and alarms the operators if the time is different from IC time.

The User Interface 112 maintains several displays 114 of the schedule, or playlist, primarily sorted by time and channel. The user interface(s) (UI) provide several convenient ways to view schedule, events, system status and alarms. The UI comprises a combination of integrated schedule, channel schedule, on-air event window, next on-air event window and alarm window. The UI has displays for schedules organized by start times, channels, current on-air event, next on-air event, event data, event detailed status, system status, video material status, or error conditions. There is at least one user interface enabling an operator to query status of events, video segments and devices, and edit the status and events. It would be apparent to one skilled in the art how to implement any custom UI to monitor, display or enable editing of data in any desired format.

The current and next-pending event for each channel are also displayed separately. Current status and error conditions are displayed for each event. A separate alarm display clearly indicates system-wide or urgent error conditions. The User Interface 112 also provides limited editing capabilities and supports queries on the status of video segments and devices.

The IC Server process 106 distributes events 120 to the Device Drivers 108, the User Interface 112 and the Log Manager 110. It also collects and summarizes execution status 122 for each event. Event execution summaries are sent to the User Interface 112, the Log Manager 110 and upward to the Event Scheduling System 102. The IC Server 106 maintains timing information for each event and reports any delays in receipt of status 124 from the devices.

As it receives the schedule from the Event Scheduling System 102, the IC Server 106 performs a suite of data integrity checks 126 to ensure that only valid data is submitted to the device drivers 108. Lists of events for each channel are checked for timing consistency (i.e., gaps or overlaps). Parent-child relationships are also checked, as well as the video path continuity for each individual event. Defective events are sent to the User Interface 112 with the error(s) highlighted, but they are not sent to the Device Drivers 108. This prevents invalid data from causing a failure in one of the real-time systems. Timers are set up by the Event Execution Controller 128 in order for the Event Distribution 120 to be properly executed.

The Device Driver subsystem 108 comprises drivers for video servers 130, video switches 132, under-monitor event displays 134, and video material management systems 136. The IC has smart interfaces with the various devices and is extensible to an arbitrary number of devices. Each Device Driver maps the event-based schedule to system-specific commands and relays status and/or errors back to the IC Server 106.

The Integration Controller is implemented with a modular architecture that allows new device drivers to be readily added to the system. The core software library for event processing of the IC is platform independent. It enables soft real-time integration to device control systems. The architecture is easily configurable and system components can be repartitioned. This architecture is described in terms of filters and pipes, in more detail below. To create a new module or repartition or change existing module, one can reassemble/add/remove the filters or reconnect them, thereby changing or creating a module with a new functionality. Each filter is responsible for a certain piece of functionality. As a result it is easy to create new modules, by reusing existing filters (pieces of functionality).

This architecture is comprised of a variety of combinations of pipes and filters, where pipe components provide mechanisms for transferring data from one or more inputs to one or more outputs, and filter components provide mechanisms restricting the passage of a variety of data received from one or more inputs to zero or more outputs. Pipes and filters may be bidirectional, allowing data to flow through them in multiple directions. Pipe and filters components may also create, modify, and/or delete data during the process of redistribution from inputs to outputs. These pipes and filters can be connected to each other in any order, and it is this order that determines the behavior of any specific chain of components. This architecture allows passing and filtering messages and events inside the IC and between systems.

The Log Manager subsystem 110 writes a record of each major Integration Controller transaction to disk. it also supports log queries with search parameters such as transaction type, severity, time and string search.

Figure 2:
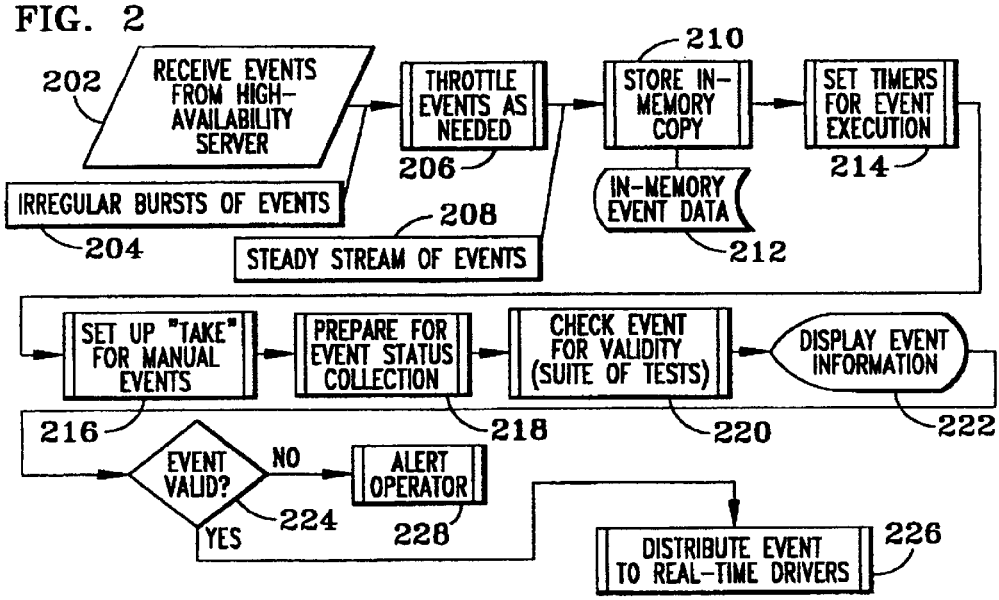
FIG. 2 is a functional flow diagram illustrating an example of how a schedule flows through the system and is distributed to low-level devices.
Figure 3:
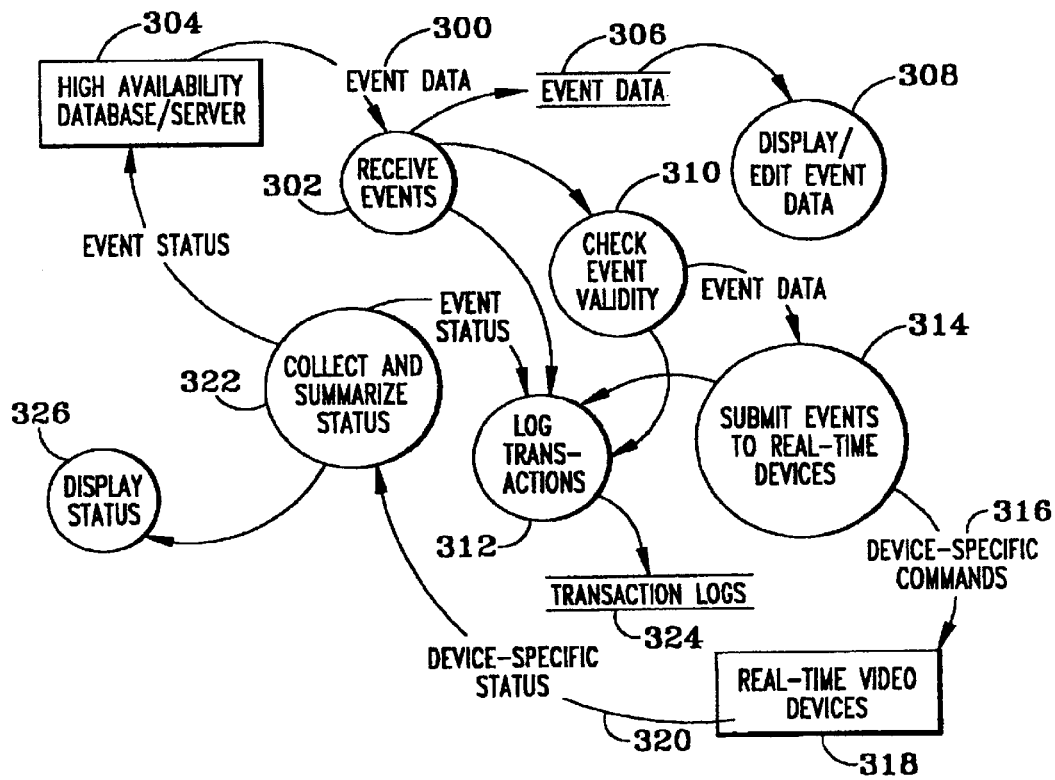
FIG. 3 is a data flow diagram illustrating an example of how a schedule, or playlist, is executed, and how information passes through the system.

The interaction of the IC subsystems can be understood more easily by referring to FIGS. 2 and 3. FIG. 2 is a functional flow diagram illustrating an example of how a schedule, or playlist, is executed, and how information passes through the system, and FIG. 3 is a data flow diagram illustrating the same method.

Referring now to FIG. 2, event data is processed by the Scheduling System Interface in both irregular bursts 204 and a steady stream of events 208 in function blocks 202 and 206. These events are scheduled into a playlist or schedule by the Throttler in function block 206. The Throttler regulates delivery of these events to the rest of the system. A preferred method for interleaving or throttling and scheduling events is described in copending U.S. patent application Ser. No. 09/352,089, filed on Jul. 14, 1999, entitled "A Throttler for Rapid Start-up of a Broadcast Automation System," filed by K. Kenny and assigned to a common assignee, the entire subject matter of which is incorporated herein by reference. This event data is received by the Integration Controller from the Event Scheduling System which contains a high-availability database and server in function block 210, where the schedule is saved in memory 212.

Block 202 is comprised of a database containing event scheduling information and an event server that distributes newly arrived information in the database to connected Integration Controllers. The event server distributes the data as fast as it can retrieve it from the database and continues until all new data has been retrieved. The amount of data that arrives in the database at any given time varies considerably, and large changes to a schedule can cause the event server to distribute data faster than an IC can receive it in block 204. The throttler 206 receives the data and delivers it in a steady flow 208 to the downstream processes. The event data is then stored in a variety of ordered lists in memory 210 and 212. The order of these lists includes, but is not limited to, time order by scheduled start time, channel designation, or event type.

Each event may cause a timer 214 to be set that determines when in time that event should be executed. Specific event types that do not have an exact execution time are defined by the IC to be executed manually, by a "Take" action, where a user interface action must be done. This action usually requires a human interaction with the user interface to execute the event. An IC supports "takes" of "sectional" events, by "taking" multiple channels with one take. In other words, ICs support sectional commercials. A sectional commercial is a commercial that has to be executed at the same time as a main net commercial, but has different content and is broadcasted to a different set of affiliates. For example, during winter, when snow tires are advertised in New York state, at the same time in Florida sunscreen lotion is advertised. Thus, these two commercials have to play at exactly the same time, even though they are on different channels and maybe on different ICs. This feature is not performed by other automation systems in the prior art.

Additional variables and lists are created and initialized to monitor the execution status of the event 218. As the event is handled by various device drivers and validity checkers, status information is collected from these mechanisms and stored in the status collection lists. The IC merges common status reporting from an arbitrary number of devices in the device driver subsystem 108, and other IC subsystem before reporting it to the upstream system (i.e., before reporting it to the operator) as a single status.

A BOC (Broadcast Operation Controller) type of IC monitors an arbitrary number of redundant paths, collects status from an arbitrary number of unique Integration Controllers and monitors an arbitrary number of Integration Controllers. The primary function of a BOC is to show to the operator all the feedback that other ICs show and to show status of other ICs (whether they are running or not, for example).

Figure 5:
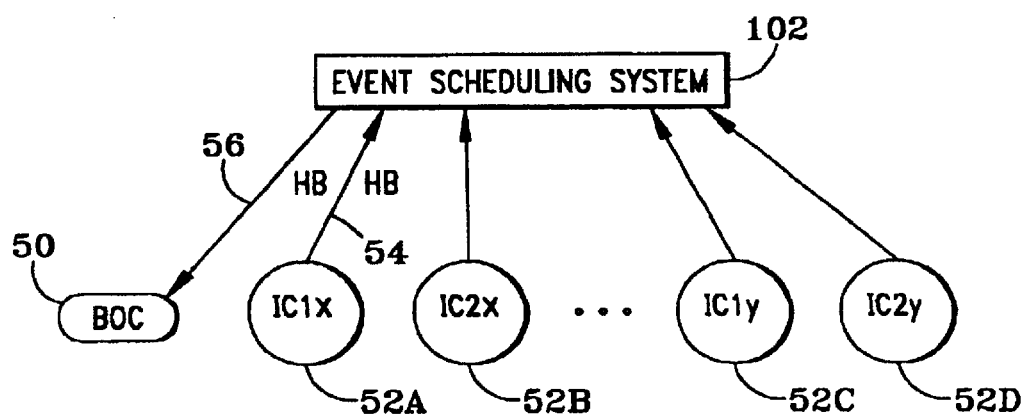
FIG. 5 shows a system with multiple Integration Controllers and a Broadcast Operation Controller (BOC) IC which monitors and collects status from an arbitrary number of unique Integration Controllers, according to the preferred embodiment of the present invention.

FIG. 5 shows a configuration of a system of a BOC 50 and several ICs 52. The ICs 52 send an HB (heartbeat message) 54 to the Event Scheduling System 102 at a configurable interval. The interval is specified in the system configuration file. The BOC subscribes to HB messages by announcing at start-up to the Event Scheduling System that it is interested to receive these messages. BOC shows alarms to the operator if it has not been receiving HB messages 56 longer then that configurable interval. In the alarm, BOC specifies the name of the IC that has not been sending the message and potentially might have a problem. At system start-up, the BOC determines from configuration files which ICs it needs to monitor.

Every action that the IC performs is recorded (logged) into text files (log files) for future reference. In the preferred embodiment, these files are compressed and moved to a dedicated sub-directory on each system, each day. The log files may be viewed, queried and searched by the user. It would be apparent to one skilled in the art how to format the log files to optimize queries and reports based on desired information.

Referring again to FIG. 2, once stored in memory 212, validity checks and event processing is done. For each event received that has an exact execution time indicated, timers are set up by the event execution controller to control when the event should begin execution in function block 214. For each event that has no exact execution time, or an indication of only approximately when the event should execute, timers are set up to alert operators when the event should begin executing in function bock 216.

The Integration Controller informs the Status Collection Mechanism that monitoring should begin for each event processed in function block 218. The events are checked for validity in function block 220. The User Interface then displays the event data, including validity conditions and execution times in function block 222. If the event passes the validity test, as determined in decision block 224, then the Integration Controller submits the event data to the Device Drivers for processing by each device in function block 226. Otherwise, the operator is alerted that an event has failed the validity test in function block 228. The IC handles redundant alarms and status messages by ignoring them. This allows multiple Integration Controllers of the same type to run simultaneously and report the same alarms.

Referring now to FIG. 3, the flow of event data through the system is shown. The event data 300 is received by the Integration Controller 302 from the high availability database 304 in the Event Scheduling System, where several actions occur. The event data 300 is stored in memory 306, the User Interface displays the event 308, and the event is checked for validity 310.

The Log Manager writes entries to disk 324 indicating what event was received, its validity status, and whether the event was submitted to the Device Drivers. If the event passes the validity checks, it is submitted to the Device Drivers 314, where device-specific commands 316 are issued. The device-specific commands 316 instruct each device 318 how to handle and execute the event data.

As each device processes the event data via the commands sent to it, status of the processing is collected 320 and summarized by the Status Collection mechanism 322 in the IC Server. Both status and status-summary information is displayed in the User Interface 326, sent to the Log Manager 312 for writing into the log 324, and sent to the Event Scheduling System 304 through the Scheduling System Interface.

All events received by the Integration Controller are displayed in a variety of user interface screens including, but not limited to, sorted by scheduled starting time, or sorted by channel, organized by current on-air event, next on-air event, event data, event detailed status, system status, video material status, and error conditions. The user interface also includes a screen for editing and modifying the event data. This screen allows a user to override the current event data values. Start time, execution duration, channel, event type, and more are editable through this screen. By changing an event's data, a user may move where an event resides in the ordered lists, as described above, thereby causing the event's execution start time to be before or after other events in the list, or change which channel the event should execute in. Other modifications may include which playback device to use, which video switch crosspoints to use when executing the event, or how the event should be executed: automatically execute after its predecessor has ended, when a specific event has begun, or when a user has manually executed the event. This last scenario can be accomplished for manual events, where a "Take" action is performed to execute the event. This action consists of selecting the manual event, and clicking on a button informing the Integration Controller to execute that event within a configurable time window. An example would be to begin playing a video segment two seconds after the "Take" action is executed in the user interface. When all data changes to an event are completed, the event is re-validated using the same validation suite of tests that were used when the event first arrived in the Integration Controller.

Figure 4:
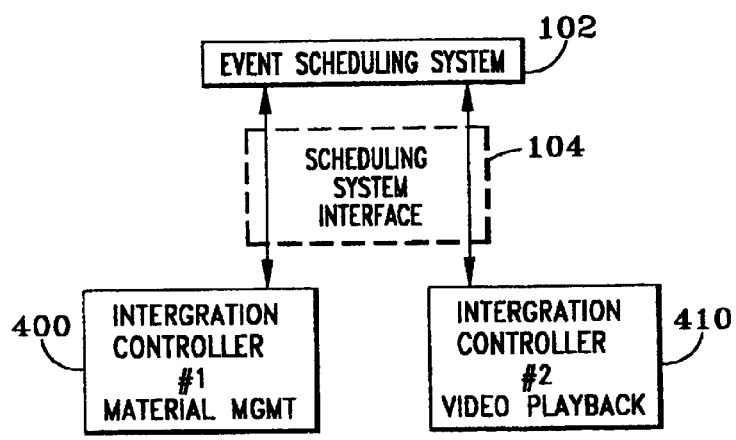
FIG. 4 shows an alternative embodiment of the invention where two Integration Controllers are configured to operate together.

The Integration Controller can be easily configured to monitor and control a particular aspect of video production. For example, referring to FIG. 4, one Integration Controller 400 may be configured to manage acquisition, storage and retrieval of video material, while a second Integration Controller 410 is configured to manage video playback. It would be apparent to one skilled in the art how to customize the user interface and the set of device drivers to create the specialized command and control workstation. Furthermore, several Integration Controller workstations that have been customized in this way can function together using the Event Scheduling System 102 as a message server.

In the preferred embodiment of the present invention, two redundant IC's of the same type are run at the same time with the same data. Thus, if the primary IC fails, the operator may switch control to the secondary IC without losing video. An IC interfaces and interoperates with machine control to enable break-ins and switch to protected secondary or primary side IC's.

On start-up, an IC reads from a configuration file information about its hardware path, i.e., whether it is the primary or secondary IC. Primary ICs use different hardware paths (video servers, routers, etc.) than protect ICs. Both ICs always perform exactly the same operations. Video that is coming out of the primary (air) path gets aired. When there is a problem with the primary path video, operators switch to the secondary (protect) path. Operation is switched back to the primary as soon as the problem is resolved. ICs coordinate their actions via the following messaging mechanism. All ICs send relevant messages to the Event Scheduling System. The Event Scheduling System forwards those messages to ICs that subscribed to them. On receiving a message, an IC performs a certain operation. For example, if one event, say a commercial, has been deleted from the primary side IC, this IC sends a delete message to the Event Scheduling System. The system forwards this message down to all ICs that subscribe to delete messages. Those ICs, like the protect side IC, that have the event that needs to be deleted will delete the event from their system. This messaging mechanism allows for any number of redundant paths, not just two.

The Integration Controller (IC) supports the workstation concept, i.e., the controller is configurable to exhibit varying behaviors. Further, the IC is local area network (LAN) and wide area network (WAN) based. Thus, the functionality of the various components may be geographically distributed. Moreover, an IC provides subscription mechanism to the Event Scheduling System. It distributes data and publishes/subscribes over the network. An IC sends data to the Event Scheduling System and to other ICs that are all located on different computers.

The preferred embodiment of the present invention comprises:
  64 profile video disk servers;
  six (6) dub stations for programming and commercial dubbing;
  six (6) short form archives in the media management library holding over 8000 commercials and 40 short playbacks;
  four (4) long form archives in the media management library holding over 30 hours of programs; and
  eight (8) long form playbacks all configured for X and Y side redundancies.

The playback environment is fully digital. The video servers eliminate the need for video tape and facilitate regional feeds and on-air promotions. When media in video tape, film, or other format is received, an operator at a inputs the content to video storage in a media management library. The non-digital formatted media may then be discarded, thereby saving valuable archive storage space. A further advantage to the digital environment is that it enables fully automatic scheduling. An operator no longer needs to manually load the media with desired content on a specific device in order to playback and broadcast the media. In the systems of the prior art, a single commercial on a physical medium could have been handled up to eight (8) times. Now it is handled only once in order to convert it into digital format and enter it into the digital library. Using the present invention, the digital media is broadcast-ready in seconds, as opposed to over one hour using the systems of the prior art. Delays in physically switching tapes, or other media, in devices for last minute scheduling changes are also avoided. Programming changes are made in a matter of seconds because all digital content is immediately available to the Event Scheduler and display devices.

Other advantages to the digital environment of the present invention relate to failure avoidance. The digital content may be duplicated in a redundant library anywhere in the network of the video/audio management system. An individual IC may be configured to receive media from any media management library in the network, and broadcast on any selected channel. Thus, if an IC fails or if a media management library becomes unavailable due to a hardware (or other) failure, an operator modifies the configuration files for the IC's, for instance, to select an alternate IC as primary or to select an alternate and uncorrupted media management library for retrieving content media. This run-time reconfiguration ability eliminates programming errors and dead air problems of the prior art systems.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An integration controller for managing scheduling, playback and media management of digital audio and video in response to an event-based playback schedule, comprising:
  a device driver sub-system comprising a plurality of device drivers for video servers, a plurality of video switches, a plurality of under-monitor event displays, and video material management systems, wherein each said device driver maps an event-based schedule to system-specific commands;
  a log manager for writing a record of transactions to a storage medium, said log manager enabling an operator to view current or archived logs, thereby providing monitoring and diagnostic capabilities during integration controller runtime;

at least one user interface for maintaining a plurality of displays for schedules organized by start times, channels, current on-air event, next on-air event, event data, event detailed status, system status, video material status, or error conditions, said at least one user interface enabling an operator to query status of events, video segments and devices, and edit said status and events;

an integration controller server for distributing a plurality of events to
a) said plurality of device drivers,
b) said at least one user interface, and
c) said log manager,
said integration controller server also collecting and summarizing execution status for each said event, and sending said execution status to the at least one user interface, said log manager, and to an event scheduling system;

a scheduling system interface for managing communication between a scheduling system and said integration controller server; and wherein said integration controller is dynamically reconfigurable to exhibit selected functions.

2. An integration controller as recited in claim 1, wherein the selected functions are distributed among a plurality of computing devices.

3. An integration controller as recited in claim 1, wherein said device driver sub-system is implemented with a modular architecture that allows new device drivers to be readily added to the system.

4. An integration controller as recited in claim 1, wherein an operator reconfigures the integration controller during runtime via a user interface, so that the scheduling system interface of the integration controller accepts or rejects events received from the scheduling system based on criteria as altered by the reconfiguration, thereby affecting distribution of the plurality of events to: the plurality of device drivers, the at least one user interface, and the log manager.

5. An integration controller for managing scheduling, playback and media management of digital audio and video in response to an event-based playback schedule, comprising:

means for analyzing a schedule for validity, wherein said schedule comprises a plurality of events;

means for checking availability of video material or loading or acquiring said video materials, if necessary, wherein said video material resides on at least one archive device;

means for submitting commands to at least one real-time sub-system to execute a plurality of valid events, wherein said validity is determined by said analyzing means;

means for monitoring each said at least one real-time sub-system and collecting and summarizing a state of each said plurality of events;

at least one user-interface allowing an operator to
a) view said schedule,
b) view errors found by said analyzing means,
c) edit said schedule,
d) manually begin execution of operator selected events, and
e) reconfigure runtime parameters of the integration controller;

means for maintaining logs of event transitions, message traffic and system status;

means for allowing said operator to query and modify the status of a plurality of video segments and at least one real-time sub-system or device; and wherein said integration controller is dynamically reconfigurable to exhibit selected functions.

6. An integration controller as recited in claim 5, wherein the selected functions are distributed among a plurality of computing devices.

7. A method for controlling digital video and audio using an integration controller for managing scheduling, playback and media management of in response to an event-based playback schedule, said method comprising the steps of:

receiving a plurality of events from a high availability database, wherein said events are received both in irregular bursts and in a steady stream of events;

throttling the plurality of events into a playback list, as new events are received in the receiving step;

storing the playback list in a scheduling database;

managing communication between the scheduling database and the integration controller;

setting timers which indicate a time for event execution of events on the playback list;

accepting manual events for entry into the playback list, the manual events being entered using a user interface;

preparing for event status collection;

checking for event validity;

displaying event information via at least one user interface; and distributing each valid event to an appropriate real time driver by translating event information stored in the scheduling database associated with the scheduled event to specialized hardware commands specific to the real time driver, wherein said integration controller is dynamically reconfigurable to exhibit selected functions.

8. A method as recited in claim 7, further comprising the step of alerting an operator if an event is determined to be invalid in the checking step.

9. A method as recited in claim 7, wherein the selected functions are distributed among a plurality of computing devices.

10. A system for controlling digital video and audio using at least one integration controller for managing scheduling, playback and media management in response to an event-based playback schedule, comprising:

means for event scheduling;

a first integration controller comprising:
a scheduling system interface;
a device driver sub-system comprising a plurality of device drivers for video servers, a plurality of video switches, a plurality of under-monitor event displays, and at least one video material management system, wherein each said device driver maps an event-based schedule to system-specific commands;
a log manager for writing a record of transactions to a storage medium, said log manager enabling an operator to view current or archived logs, thereby providing monitoring and diagnostic capabilities during integration controller runtime;
at least one user interface for maintaining a plurality of displays for schedules organized by start times, channels, current on-air event, next on-air event, event data, event detailed status, system status, video material status, or error conditions, said at least one user interface enabling an operator to query status of events, video segments and devices, and edit said status and events;

an integration controller server for distributing a plurality of events to
  a) said plurality of device drivers,
  b) said at least one user interface, and
  c) said log manager; and wherein said scheduling system interface manages communication between said means for event scheduling and said integration controller server, said means for event scheduling having a scheduling database, and wherein said integration controller also collects and summarizes execution status for each said event, and sending said execution status to at least one user interface, said log manager, and to said means for event scheduling, wherein said integration controller is dynamically reconfigurable to exhibit selected functions.

11. A system as recited in claim 10, further comprising:

at least one additional integration controller, wherein said event scheduling means coordinates message traffic comprising events and status among and between the first integration controller and the at least one additional integration controller.

12. A system as recited in claim 11, wherein the first integration controller is designated as a primary integration controller and the at least one additional integration controller is designated as a secondary integration controller, the secondary integration controller mirroring all activities of the primary integration controller, and controlling a set of hardware devices not controlled by the primary integration controller, the secondary integration controller producing video and audio output identical to video and audio output produced by the primary integration controller, wherein the identical video and audio output produced by the secondary integration controller is not aired.

13. A system as recited in claim 12, wherein duplicate alarms generated by the first integration controller and the at least one additional integration controller are ignored.

14. A system as recited in claim 10, wherein the selected functions are distributed among a plurality of computing devices.

15. A system as recited in claim 11, wherein the first integration controller and the at least one additional integration controller are dynamically configured to accept only a desired set of commands and to control only a subset of devices in the system.

16. A system as recited in claim 11, wherein the first integration controller and the at least one additional integration controller supports "takes" of "sectional" events, by "taking" multiple channels with one take.

17. A system of claim 11 further comprising a broadcast operation controller for monitoring the first integration controller and the at least one additional integration controller.

* * * * *

UNITED STATES PATENT AND TRADEMARK OFFICE
CERTIFICATE OF CORRECTION

PATENT NO.    : 6,792,469 B1
DATED         : September 14, 2004
INVENTOR(S)   : Mary K. Callahan et al.

It is certified that error appears in the above-identified patent and that said Letters Patent is hereby corrected as shown below:

<u>Title page,</u>
Item [75], Inventors, please delete "John Espirito Santo Amaral" and insert
-- Joseph Espirito Santo Amaral --

Signed and Sealed this

Eighth Day of February, 2005

JON W. DUDAS
*Director of the United States Patent and Trademark Office*